April 3, 1928.

B. M. BROWNELL

PIPE COUPLING

Filed Dec. 14, 1925

1,664,848

Inventor:
Barnett Morse Brownell,

His Attorneys.

Patented Apr. 3, 1928.

1,664,848

UNITED STATES PATENT OFFICE.

BARNETT MORSE BROWNELL, OF ST. LOUIS, MISSOURI, ASSIGNOR TO DIAMOND METAL PRODUCTS CO., A CORPORATION OF MISSOURI.

PIPE COUPLING.

Application filed December 14, 1925. Serial No. 75,242.

This invention relates to pipe couplings and consists of the novel construction hereinafter disclosed.

An object of the invention is to provide a quickly detachable coupling, one member of which has connected therewith a gasket held in assembled position so that the other member of the coupling carried by another pipe section may be readily joined thereto to form a sealed joint.

Figure 1:
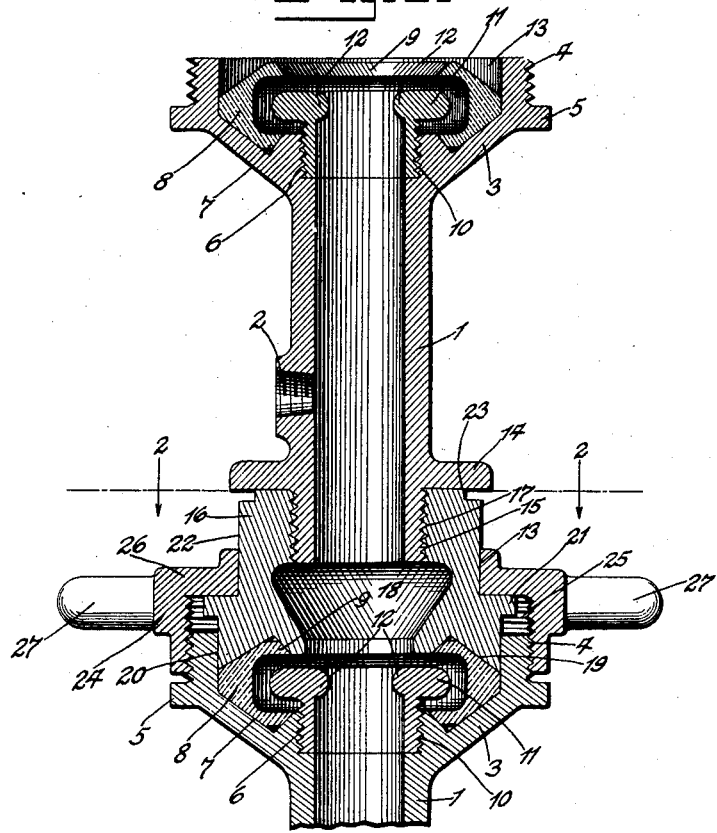
Figure 2:
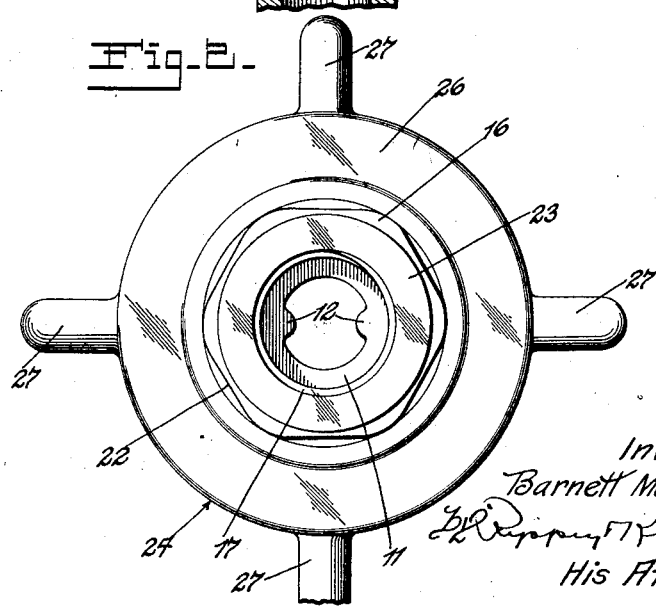

Additional advantages of the invention will be apparent from the following detailed description thereof, taken in connection with the accompanying drawing in which Fig. 1 is a vertical section; and Fig. 2 is a plan view on the line 2—2 of Fig. 1.

In the embodiment of the invention illustrated in the drawing, the invention is shown as comprising two pipe sections coupled together. Each pipe section includes a cylindrical portion constituting a section of a conduit. The section 1 may be tapped at 2 for attachment of a branch conduit.

The section 1 has an enlarged portion 3 at its upper end, said portion 3 being externally threaded at 4 and having a flange 5 extended outwardly from the base of the threaded section. The internal wall of the portion 3 is threaded at 6 adjacent to the axial opening in the member 1.

The bottom surface of the portion 3 is formed with diverging walls to provide a substantially V-shaped seat 7 for the lower face of a gasket 8, said gasket being substantially V-shaped in cross section, and at the wide inwardly deflected flanges 9, form the outer arms of the V.

The gasket is releasably held in the seat in the portion 3 by a screw-threaded member having a cylindrical threaded portion 10 that threads into the threads 6 of the portion 3, said member also having an annular flange 11, the outer edges of which are rounded as clearly shown in Fig. 1 of the drawing, said flange being arranged to extend into the opening in the gasket 8.

Extending inwardly from the walls of the retaining member are projections 12 so that a tool may be inserted into the gasket retaining member to secure it into place by tightening the threaded portion thereof in the threads 6. The gasket is thus always held in place in the member 3 so that it will be in a position to receive the other coupling member that is connected onto the opposite end of the connection 1.

The upper portion 13 of the gasket seat formed in the member 3 is of cylindrical form. The lower end of the member 1 is formed with an annular flange 14 and has a threaded portion 15 below the flange. The other coupling member 16 has an axial opening therethrough, the upper portion of which is threaded at 17 so that it may be threaded onto the threaded portion 15. Below the threaded portion 17 is an enlarged cavity 18, the walls of which extend outwardly from the cylindrical portion and then incline inwardly, as clearly shown in the drawing.

The lower face of the member 16 is formed with a V-shaped channel 19, while the lower side wall of the member 16 has a cylindrical section 20, above which is an annular flange 21. Above the annular flange is a polygonal section 22 and above the polygonal section is a reduced cylindrical section 23. The polygonal section provides means for tightening the threads 15 and 17 to connect the member 16 with the end of the member 1, the upper face of the member 16 abutting against the lower face of the flange 14.

An internally threaded ring 24, having a threaded portion 25 and an inwardly extending flange portion 26, is adapted to thread over the threads 4 and to be tightened into place by means of finger pieces 27 that extend outwardly from the ring. When the ring is tightened on the threads 4, the member 16 is drawn downwardly so that the cylindrical wall 20 thereof telescopes into the cylindrical portion 13 of the member 3, drawing the lower face of the member 16 downwardly against the upper face of the gasket, the upper face of the gasket seating in the V-shaped channel 19.

From the foregoing description, it will be understood that the two coupling sections may be readily connected and disconnected and that when connected, a tight joint is effected, which will hold against fluid pressure, such as water, steam, compressed air, or any other fluid under high pressure, for the reason that when pressure is introduced in the conduit, the gasket will be forced outwardly against the seat therefor comprising the channel 7 and the channel 19. It will further be observed that because of the gasket being held in place by the retaining member, the gasket will always be in a position to readily seat when the two coupling members are drawn together by the ring 24, which is quickly manipulated by the members 27. Inasmuch as the member 16 is free to move in a rotary direction, the joint may be swiveled after it has been tightened without breaking the seal of the coupling.

I am aware that the invention may be modified in numerous particulars without departing from the spirit and scope thereof, and what I claim and desire to secure by Letters Patent is:

1. In a pipe coupling the combination of a pair of coupling members having contacting telescoping swivel connection and each having an annular groove in its end, said grooves being opposite each other, a clamping device holding said members in contacting telescoping connection, a gasket wholly enclosed by said members and seated in said grooves and having a groove extending outwardly from its inner side, an element screwed into the end of one of said members out of contact with said gasket, and a flange integral with said element extending into said groove in said gasket and being out of contact with said gasket leaving said gasket free to expand in said grooves in said members.

2. In a pipe coupling the combination of a pair of coupling members having contacting telescoping connection and being relatively rotative and having a gasket seat between their ends inside of one of said members, a clamp holding said members in said relationship and permitting relative rotation of said members, a gasket of expansible material wholly enclosed by said members and mounted in said gasket seat and having a groove extending outwardly from its inner side, an element in connection with one of said members extending into said gasket, and a flange on said element extending into said groove and being out of contact with said gasket, leaving said gasket free to expand and contract.

3. In a pipe coupling the combination of a pair of coupling members having contacting telescoping swivel connection and each having an annular groove in its end, said grooves being opposite each other, a clamping device holding said members in contacting telescoping connection, a gasket wholly enclosed by said members and seated in said grooves and having a groove extending outwardly from its inner side, an element screwed into the end of one of said members out of contact with said gasket, a flange integral with said element extending into said groove in said gasket and being out of contact with said gasket leaving said gasket free to expand in said grooves in said members, and engageable projections on the inside of said element for the purpose described.

BARNETT MORSE BROWNELL.